Nov. 12, 1940.  A. R. MAIER  2,221,486
GUARD FOR ROTARY MACHINES
Filed Dec. 29, 1938  2 Sheets-Sheet 1
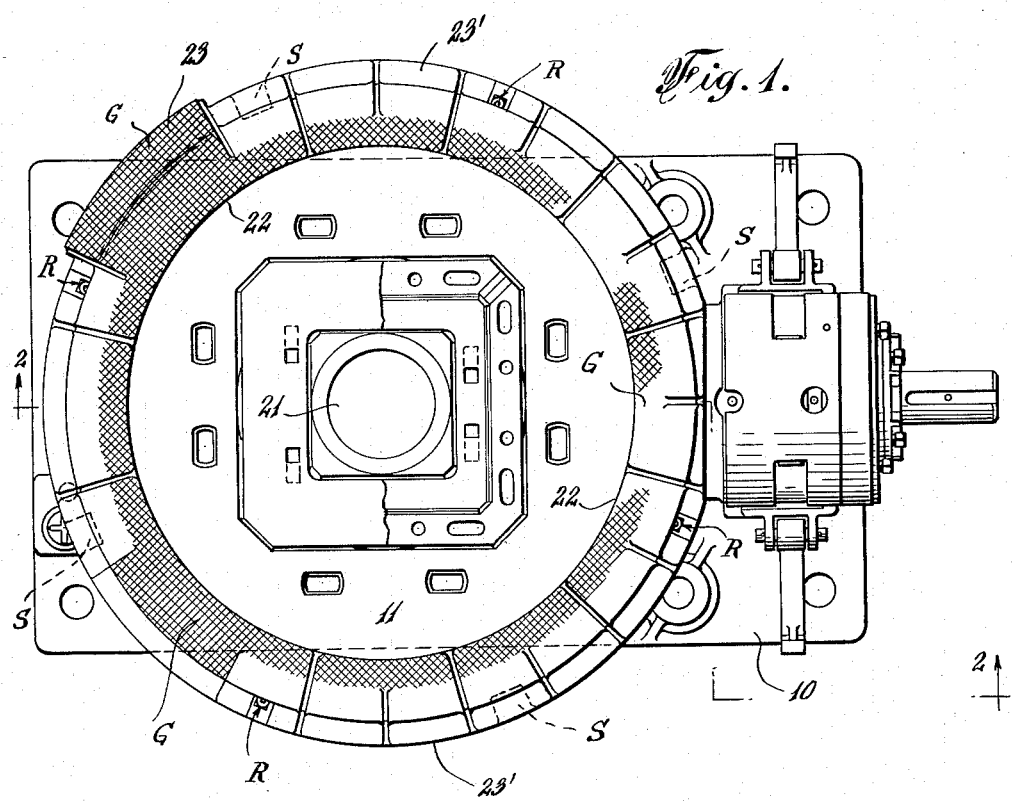
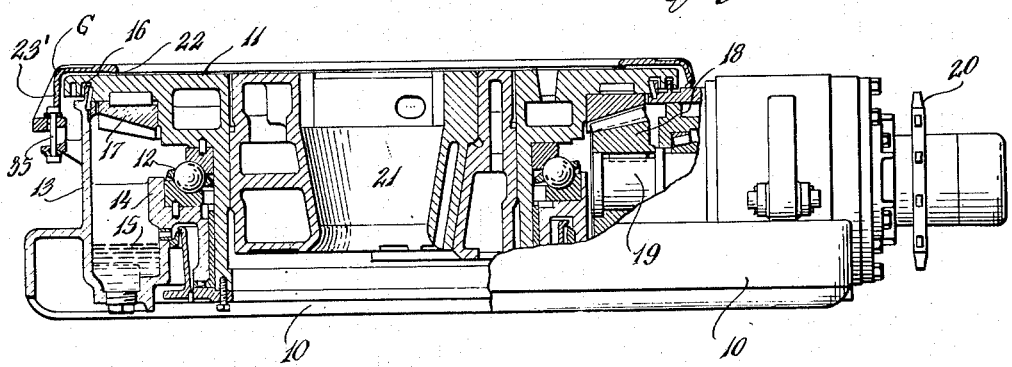
INVENTOR
August R. Maier
BY John E. Jackson
ATTORNEY Nov. 12, 1940.  A. R. MAIER  2,221,486
GUARD FOR ROTARY MACHINES
Filed Dec. 29, 1938  2 Sheets-Sheet 2
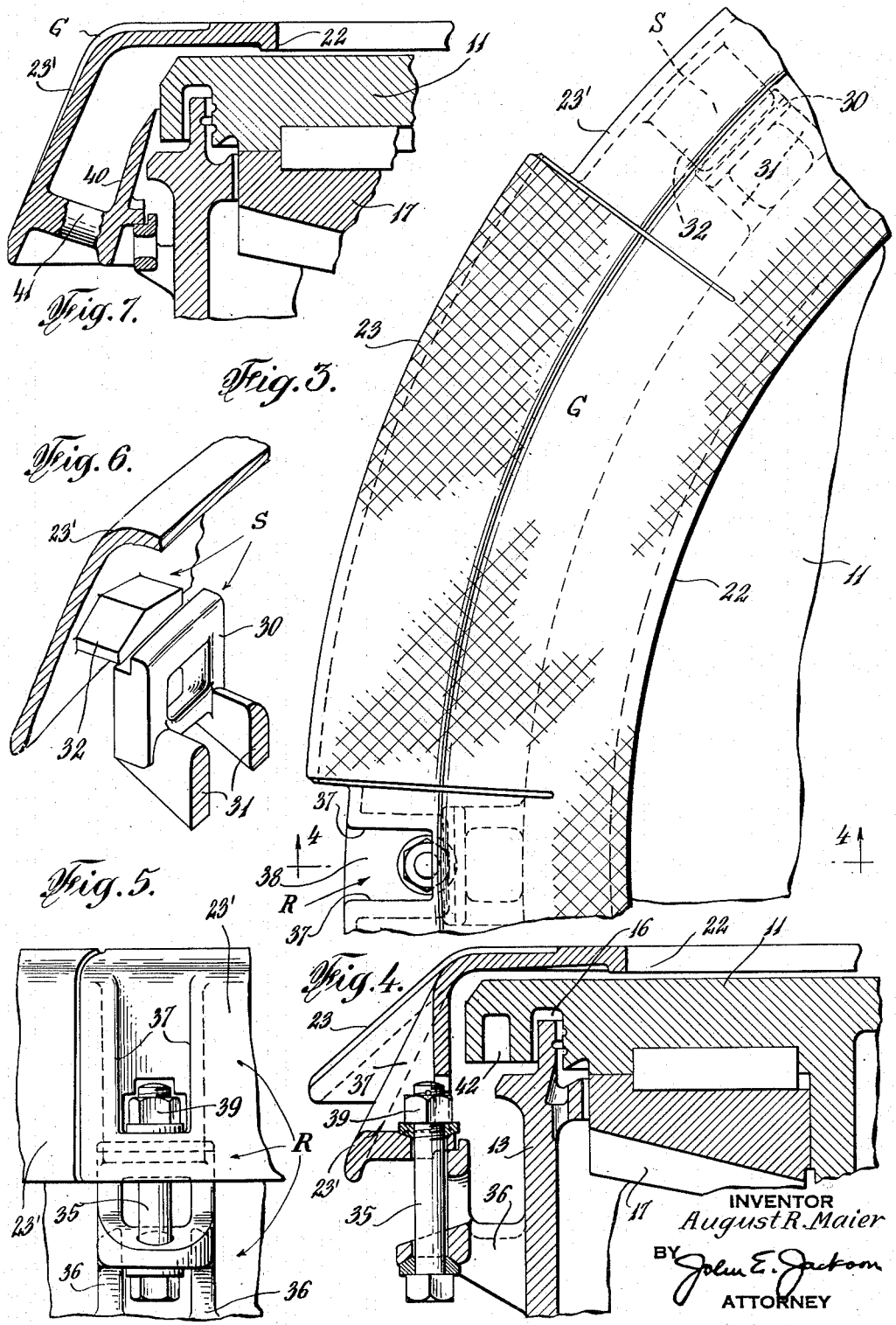
INVENTOR
August R. Maier
BY John E. Jackson
ATTORNEY Patented Nov. 12, 1940

2,221,486

UNITED STATES PATENT OFFICE 2,221,486

GUARD FOR ROTARY MACHINES

August R. Maier, Dallas, Tex., assignor to Oil Well Supply Company, a corporation of New Jersey Application December 29, 1938, Serial No. 248,317

3 Claims. (Cl. 255—23)

This invention relates to rotary drilling machines and more particularly to an improved guard member for use with such machines. One of the objects of the present invention is to provide a guard member for the said machine which does not clog or cake with the precipitated mud from drilling fluid escaping over the surface of the rotating table of said machine. Another object is to provide a guard member which is shaped to provide a foot rest for the driller when making or breaking-out joints. Still another object is to provide a guard member which more effectively prevents drilling fluid escaping from the top of the rotating table from entering the oil chamber of the rotary. Other objects and advantages will be apparent as the invention is further disclosed.

In accordance with these objects, I have devised the improved guard member illustrated in the accompanying drawings, wherein:

Fig. 1 is a top plan view of a rotary device equipped with the improved guard member of the present invention; Fig. 2 is a side view of the same partly in section; Fig. 3 is an enlarged top plan view of a section or portion of the guard member; Fig. 4 is an enlarged section along plane 4—4 of Fig. 3; Fig. 5 is an enlarged side elevational view of the portion sectioned in Fig. 4; Fig. 6 is a perspective view illustrating one feature of the present invention; Fig. 7 is a sectional view similar to that of Fig. 4 illustrating a modification of the present invention.

Referring to the drawings, a rotary machine comprises a base 10 and a table 11 rotatably supported on the base by means of anti-friction bearings 12. Base 10 has an upstanding outer annular wall 13 extending upwardly to the under face of the table 11 and an inner annular wall 14 upon which the bearing 12 is supported. The two walls 13 and 14 thus form an annular oil or lubricant chamber 15 enclosing the bearing 12. Table 11 is provided about its outer edge with an annular recess 16 slidably engaging the upper edge of outer wall 13 in an interlocking seal to prevent the inflow of mud and water into chamber 15. An annular gear 17 is provided on the under surface of table 11 and means such as pinion 18 on drive shaft 19 and drive sprocket 20 are provided to rotate table 11 on bearings 12. The drill stem (not shown) is vertically sustained through central opening 21 in the machine and is detachably secured to rotating table 11. It is customary in the art, as shown by Maier Patent No. 2,073,559 issued March 9, 1937, to provide ring-shaped guard member G having an outer depending flange supported on or by the outer wall 13 in a position overlapping the outer rotating edge of table 11. The primary purpose of the guard member G is to prevent accidental contact of the workmen with the rotating table. The secondary purpose is to prevent the mud escaping over the edge of the revolving table 11 of the rotary from being thrown out thereby causing a hazardous floor condition adjacent the table.

In accordance with the present invention the guard member G is improved by outwardly flaring depending flange 23 to provide a gradually enlarging passageway between inner surface of flange 23 and the outer wall 13 of the rotary machine so as to prevent the accumulation and the caking of mud therebetween deposited by fluid being thrown off the outer edge of rotary table 11, and also is improved by varying the angle of flare in different sections of the flange to provide varying foot rests for workmen in making up or breaking-out joints in the drill stem.

Referring now to Figs. 3 to 7 inclusive, the details of the improved guard G of the present invention and the means for sustaining the same on outer wall 13 of the rotary may be noted.

Guard G comprises a ring-shaped plate member having an outside diameter approximating the outside diameter of table 11, provided with an inner downwardly extending flange 22 and a downwardly extending outwardly flared flange 23. The under surface of flange 23 is provided with means as indicated at S, cooperating with means on the outer surface of the rotary machine, for sustaining the guard G in guarding position over table 11 and with means as indicated at R to restrain the guard against vertical and horizontal displacement.

In the arrangement shown in the drawings, flange 23 is flared outwardly from the vertical at a sufficient angle to the horizontal to provide a gradually enlarging passageway between the edge of table 11 and the inner surface of the flange 23. The mud laden fluid which passes flange 22 and is thrown off the edge of table 11 is intercepted by the flange 23 and deflected downwardly and outwardly from outer wall 13 of the rotary device. The particular angle of flare may be widely varied between 0 to substantially less than 90° from the vertical without departing essentially from the nature and scope of the present invention. I prefer to provide an angle of 30° from the vertical as this appears most suitable under general operating conditions. I may provide flange 23 with one or more sections at different flared angles, substantially as indicated, wherein the section 23 of guard G is approximately at an angle of 45° from the vertical and the section 23' carrying the means S is approximately at 30° from the vertical.

Support means S substantially comprises a lug 30 secured in supporting position on wall 13 in any convenient manner as by extensions 31 integral with the wall 13, the inner surface of flange 23 on section 23' being provided with an attachment 32 adapted to seat on lug 30 in any convenient manner to horizontally sustain guard G. The manner of engagement of attachment 32 with lug 30 may be varied widely without departure from the present invention as one skilled in the art will recognize. A plurality of support means S are provided as indicated in the drawings to obtain a secure horizontal support for the guard G.

Means R substantially comprises a hold-down means consisting of a bolt 35 vertically sustained in extension 36 secured onto outer wall 13 in spaced relation thereto and flange 23' is provided with a recessed section 37 and a seat 38 provided with an opening through which bolt 35 extends so that nut 39 may be threaded thereon. A plurality of hold-down means R are provided as indicated in the drawings.

Referring to Fig. 7, a modification of the present invention is illustrated wherein an inner annular guard member 40 is provided which is sustained in spaced relation to the flange 23 in any convenient manner, as by bridge means 41. The upper end of guard member 40 is located in a position to catch all drippings from the edge of table 11 carrying the same away from the side wall 43 of the table and protecting support means S from said drippings.

From the above description of the present invention and from the drawings illustrating the same it is apparent that many modifications and adaptations may be made therein without essentially departing from the nature and scope thereof and all such modifications and departures are contemplated as may fall within the scope of the accompanying claims.

What I claim is:

1. A guard member for a rotary drilling machine, said guard member comprising a ring-shaped plate member having an outside diameter approximating that of the rotary table of said machine, an outwardly flared depending flange on the outer edge of said ring member, the angle of said flare from the vertical being at least sufficient to provide an enlarging passageway for mud laden fluid thrown from the edge of said rotary table with sections of said flange being flared outwardly at different angles to provide spaced foot rest areas, the under surface of said flange being provided with means cooperating with means on the outer wall of said machine to sustain said guard member in guarding position over said table.

2. A self-cleaning guard member for a rotary table, having an annular portion adapted to lie partially over the upper face of the rotary table in spaced relation thereto to define a horizontal annular fluid passage therebetween, the guard member also having a depending annular flange extending from said annular portion and adapted to be disposed downwardly over the edge of the rotary table, said flange being outwardly and downwardly inclined at an angle of about 30° from the vertical and defining an annular fluid discharge passage with the edge of the table in communication with said horizontal passage, the relative inclination of the annular flange and annular portion of the guard member being sufficient to prevent packing of entrained solids at their juncture from the fluid centrifugally thrown by the rotary table, said discharge passage having a downwardly increasing cross-sectional area to provide unrestricted discharge of the fluid away from the rotary table.

3. A guard member for a rotary drilling machine having a base, a rotary table horizontally supported on said base and annular outer and inner wall extensions forming an oil chamber enclosing the means rotatably supporting said table, the upper edge of the annular outer wall extension engaging within an annular recess on the under side of said table forming therewith a seal preventing mud and fluid discharged from the outer edge of said table from entering into said chamber, said guard member comprising a ring-shaped plate member having an outside diameter approximating that of said table, said plate member being provided with an outer depending flange flared outwardly from the said member at an angle of about 30° from the vertical, means on the under side of said flange to engage the outer wall of said chamber to horizontally sustain said plate member over the said table in guarding position over the said table, and means to secure the same against vertical displacement in said sustained position, the said annular flange being provided with a plurality of sections each at different angles to the vertical.

AUGUST R. MAIER.